US007194619B2

(12) United States Patent
Abbondanzio et al.

(10) Patent No.: US 7,194,619 B2
(45) Date of Patent: Mar. 20, 2007

(54) REMOTELY BOOTING DEVICES IN A DENSE SERVER ENVIRONMENT WITHOUT MANUALLY INSTALLING AUTHENTICATION PARAMETERS ON THE DEVICES TO BE BOOTED

(75) Inventors: Antonio Abbondanzio, Raleigh, NC (US); Simon C. Chu, Chapel Hill, NC (US); Gregory William Dake, Durham, NC (US); Michael David Day, II, Cary, NC (US); William Joseph Piazza, Holly Springs, NC (US); Gregory Brian Pruett, Raleigh, NC (US); David B. Rhoades, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 757 days.

(21) Appl. No.: 10/109,230

(22) Filed: Mar. 26, 2002

(65) Prior Publication Data
US 2003/0188176 A1    Oct. 2, 2003

(51) Int. Cl.
*G06F 15/177*   (2006.01)
*H04L 9/00*     (2006.01)
(52) U.S. Cl. .......................... 713/155; 713/2; 709/222
(58) Field of Classification Search ........... 713/2–100, 713/185–225; 712/185; 365/185.33; 709/180–225
See application file for complete search history.

(56) References Cited
U.S. PATENT DOCUMENTS

| 5,349,643 | A | * | 9/1994 | Cox et al. ................. 713/155 |
| 5,577,210 | A | | 11/1996 | Abdous et al. ............ 395/200.1 |
| 5,870,554 | A | | 2/1999 | Grossman et al. ........ 395/200.52 |
| 5,872,968 | A | | 2/1999 | Knox et al. ................. 395/652 |
| 5,892,902 | A | | 4/1999 | Clark ..................... 395/187.01 |
| 5,948,101 | A | | 9/1999 | David et al. .................... 713/2 |
| 5,974,547 | A | * | 10/1999 | Klimenko ....................... 713/2 |
| 6,138,236 | A | * | 10/2000 | Mirov et al. ................. 713/200 |
| 6,189,100 | B1 | | 2/2001 | Barr et al. .................... 713/182 |
| 6,223,284 | B1 | * | 4/2001 | Novoa et al. ................ 713/100 |
| 6,282,642 | B1 | | 8/2001 | Cromer et al. ................. 713/2 |
| 6,317,826 | B1 | | 11/2001 | McCall et al. ................. 713/1 |
| 6,560,706 | B1 | * | 5/2003 | Carbajal et al. ............ 713/155 |
| 6,633,978 | B1 | * | 10/2003 | Angelo et al. .............. 713/100 |
| 6,751,658 | B1 | * | 6/2004 | Haun et al. ................. 709/222 |
| 2002/0154781 | A1 | * | 10/2002 | Sowa et al. ................. 380/278 |

* cited by examiner

Primary Examiner—Gilberto Barrón, Jr.
Assistant Examiner—Brandon Hoffman
(74) Attorney, Agent, or Firm—Robert A. Voigt, Jr.; Winstead Sechrest & Minick P.C.

(57) ABSTRACT

A method, system and computer program product for remotely booting devices. A deployment server may remotely transmit authentication parameter(s), e.g., public key, secret key, to a service unit configured to establish a private connection between server blades and the deployment server. The service unit may remotely install the authentication parameter(s) onto the server blade(s) to be booted by either the deployment server or another boot server. By the service unit remotely installing the authentication parameter(s) onto the server blade(s), the need to manually install them during each network boot operation may be alleviated. By remotely transmitting authentication parameter(s) instead of manually installing them on the devices to be booted during each network boot operation, the deployment server may be able to generate unique authentication parameter(s), e.g., public/private key pair, secret key, for each network boot operation thereby substantially reducing the exposure to replay attacks.

56 Claims, 7 Drawing Sheets

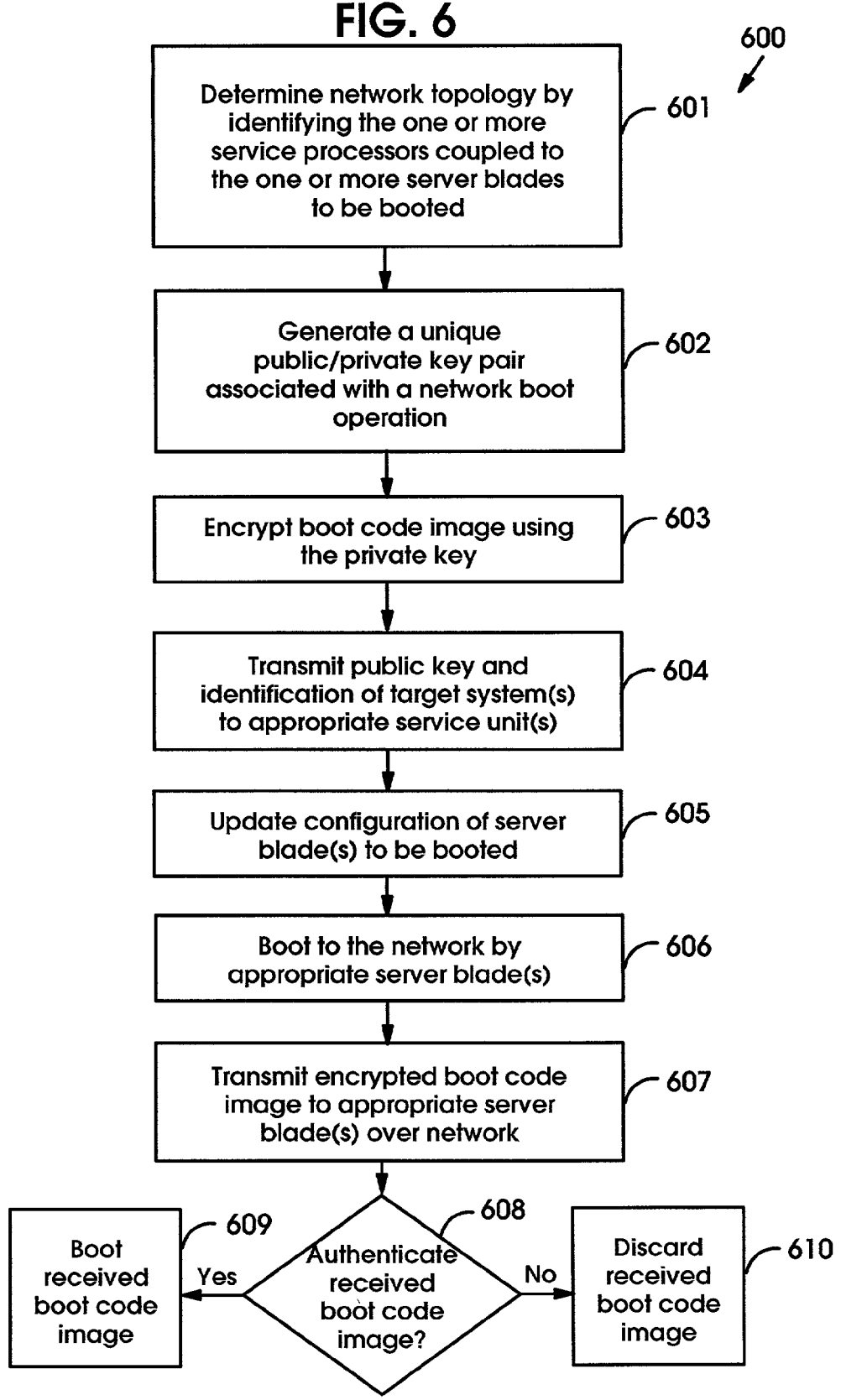

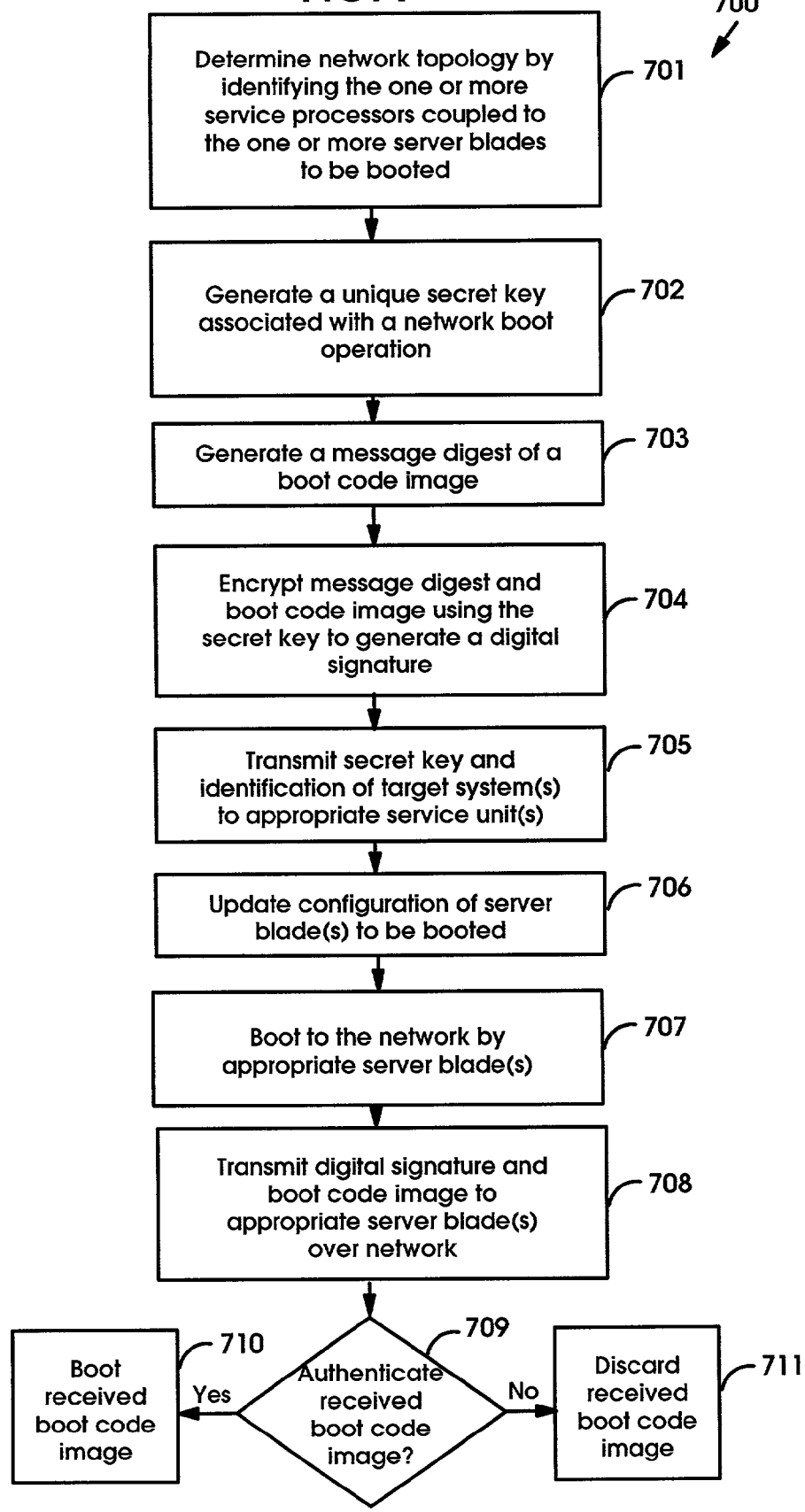

REMOTELY BOOTING DEVICES IN A DENSE SERVER ENVIRONMENT WITHOUT MANUALLY INSTALLING AUTHENTICATION PARAMETERS ON THE DEVICES TO BE BOOTED

TECHNICAL FIELD

The present invention relates to the field of a dense server environment, and more particularly to remotely booting devices in a dense server environment by remotely configuring authentication parameters, e.g., public key, instead of manually installing them on the devices to be booted thereby being able to generate unique public/private key pairs for each network boot operation which may substantially reduce the exposure to replay attacks.

BACKGROUND INFORMATION

In a dense server environment, multiple computer systems commonly referred to as server blades may each have the ability to access a boot device over a network, e.g., Local Area Network (LAN). A server blade may refer to a typical server that does not include a storage unit, e.g., hard disk drive, Compact Disc Read Only Memory (CD-ROM) drive, floppy disk drive. Since the server blade may not include a storage unit configured to store a boot code image, i.e., binary executable boot code, the server blade may have to be remotely booted such as by a boot device.

Typically, the boot device may implement network boot protocols, e.g., PXE/BIS, iSCSI, that require authentication parameters, e.g., public key, username/password, to be manually installed on the server blades by an administrator in order to remotely boot the server blades. For example, in the BIS protocol, the boot device may generate public/private key pairs where the public key may have to be manually installed on the server blade to be booted. The server blade may then request to receive the boot code image, i.e., binary executed boot code, from the boot device in order to remotely boot. The boot device may then sign the boot code image using a corresponding private key. That is, the boot device may encode the executable boot code using the private key. The boot device may subsequently transmit the signed boot code image to the server blade. The server blade may then decrypt the signed boot code image using the public key manually installed on the server blade.

Since the authentication parameters, e.g., public key, may have to be manually installed on the server blade by an administrator, the boot device may not generate unique public/private key pairs for each network boot operation. That is, in order for the boot device to generate unique public/private key pairs for each network boot operation, the administrator may have to physically visit the device to be booted for each network boot operation to update the authentication parameters, e.g., public key. Because of the time involved in updating the authentication parameters by the administrator, the public/private key pair may typically not be changed for each network boot operation. Consequently, the server blade may remotely boot from the boot device for multiple network boot operations using the same public/private key pair. Accordingly, a security exposure to replay attacks may occur. A replay attack may refer to another server (commonly referred to as a rogue server) intercepting the encrypted boot code image transmitted between the boot device and the server blade to be booted. The rogue server may then re-transmit the encrypted message, which may be outdated, at a later point in time to that server blade and thus gain control of that server blade and be able to direct it to perform unintended operations. The server blade may then boot to the outdated boot code image since the public key decrypts the encrypted boot code image. That is, the server blade may boot to the outdated boot code image since the public/private key pair did not change.

If authentication parameters, e.g., public key, secret key, were configured remotely instead of manually installing them on the server blades, a boot device may be able to generate unique authentication parameter(s), e.g., public/private key pair, secret key, for each network boot operation thereby substantially reducing the exposure to replay attacks.

It would therefore be desirable to remotely configure authentication parameters, e.g., public key, secret key, instead of manually installing them on the devices to be booted thereby being able to generate unique authentication parameter(s), e.g., public/private key pair, secret key, for each network boot operation which may substantially reduce the exposure to replay attacks.

SUMMARY

The problems outlined above may at least in part be solved in some embodiments by a deployment server configured to remotely transmit authentication parameter(s), e.g., public key, secret key, to a service unit configured to establish a connection between server blades and the deployment server. The service unit may remotely install the authentication parameter(s), e.g., public key, secret key, on the server blade(s) to be booted by the deployment server or another boot server. By remotely transmitting authentication parameters, e.g., public key, secret key, instead of manually installing them on the devices to be booted during each network boot operation, the deployment server may be able to generate unique authentication parameter(s), e.g., public/private key pair, secret key, for each network boot operation. By generating unique authentication parameter(s), e.g., public/private key pair, secret key, for each network boot operation, the exposure to replay attacks may be substantially reduced.

In one embodiment of the present invention, a method for remotely booting devices using asymmetric cryptography may comprise the step of a deployment server determining a network topology such as by identifying the one or more service units coupled to the one or more server blades determined to be booted by either the deployment server or a customer boot server. The deployment server and customer boot server may both be configured to store a boot code image, i.e., binary executable code, thereby being able to function as a boot device. The service unit may be configured to establish a connection between the server blades and the deployment server. The customer boot server may be coupled to the server blades over a public network, e.g., campus Local Area Network (LAN); whereas, the deployment server may be coupled to the service unit over a private connection, e.g., private LAN.

The deployment server may generate unique authentication parameter(s), e.g., public/private key pair, associated with a network boot operation. The deployment server may then encrypt a boot code image, i.e., binary executable boot code, that will be booted by the one or more server blades determined to be booted by either the deployment server or the customer boot server. That is, the deployment server may encode the boot code image using the private key generated.

The deployment server may transmit to a service unit authentication parameter(s), e.g., public key generated, if any server blades coupled to that service unit are to booted by either the deployment server or the customer boot server. The deployment server may further transmit the identification of the one or more server blades coupled to that service unit that are to be booted by either the deployment server or the customer boot server. The deployment server may further transmit to the service unit the information as to which server, e.g., the customer boot server, is to boot the one or more server blades coupled to that service unit that were determined to be booted.

Upon receiving the authentication parameter(s), e.g., public key, and/or information indicating which server blade(s) coupled to the service unit are to be booted and/or information indicating which device is to boot those server blade(s), the service unit may then update the configuration of those server blade(s). For example, the service unit may update a configuration file stored in the server blade indicating which network adapter, e.g., Ethernet Adapter, to boot to either the deployment server or the customer boot server. Furthermore, the service unit may update a configuration file to indicate which device, e.g., deployment server, customer boot server, to boot from. Furthermore, the service unit may write the authentication parameter(s), e.g., public key, in the one or more server blades determined to be booted by either the deployment server or the customer boot server. By the service unit writing the authentication parameter(s), e.g., public key, in the server blade instead of an administrator manually installing the authentication parameter(s), e.g., public key, on the server blade, the deployment server may be able to generate unique authentication parameter(s), e.g., public/private key pair, for each network boot operation. By the deployment server generating unique authentication(s), e.g., public/private key pair, for each network boot operation, the exposure to replay attacks may be substantially reduced.

The one or more server blades determined to boot from either the deployment server or the customer boot server may then boot from the appropriate device, e.g., deployment server, customer boot server.

Once the server blade(s) initiate the boot from the appropriate device, e.g., deployment server, customer boot server, the appropriate device may transmit the encrypted boot code image to the server blade(s). In one embodiment, the deployment server may be configured to coordinate one or more customer boot servers to store one or more different boot code images in encrypted form. Subsequently, a customer boot server may be configured to transmit the encrypted boot code image to the server blade that booted from that customer boot server. It is noted that the deployment server may also be configured to store one or more different boot code images in encrypted form as well as transmit the encrypted boot code image to the server blade if the server blade booted from the deployment server.

A determination may then be made by the server blade receiving the encrypted boot code image as to whether the received boot code image is authenticated. If the received boot code image is authenticated, then the server blade may boot the received boot code image. That is, if the authentication parameter(s), e.g., public key, received by the server blade decrypt the received encrypted boot code image, then the server blade may boot the received boot code image. If the authentication parameter(s), e.g., public key, received by the server blade do not decrypt the received encrypted boot code image, then the server blade may discard the received boot code image.

In another embodiment of the present invention, a method for remotely booting devices using symmetric cryptography may comprise the step of a deployment server determining a network topology such as by identifying the one or more service units coupled to the one or more server blades determined to be booted by either the deployment server or a customer boot server. The deployment server and customer boot server may both be configured to store a boot code image, i.e., binary executable code, thereby being able to function as a boot device. The service unit may be configured to establish a connection between the server blades and the deployment server. The customer boot server may be coupled to the server blades over a public network, e.g., campus Local Area Network (LAN); whereas, the deployment server may be coupled to the service unit over a private connection, e.g., private LAN.

The deployment server may generate a unique authentication parameter, e.g., secret key, associated with a network boot operation. The deployment server may then implement a hash algorithm to generate a message digest of the boot code image, i.e., binary executable boot code, that will be booted by the one or more server blades determined to be booted by either the deployment server or the customer boot server. The message digest of the boot code image and the boot code image may then be encoded using the authentication parameter generated, e.g., secret key, to generate what is commonly referred to as a digital signature.

The deployment server may transmit to the service unit the authentication parameter, e.g., secret key generated, if any server blades coupled to that service unit are to be booted by either the deployment server or the customer boot server. The deployment server may further transmit the identification of one or more server blades coupled to that service unit that are to be booted by either the deployment server or the customer boot server. The deployment server may further transmit to the service unit information as to which server, e.g., customer boot server, is to boot the one or more server blades coupled to that service unit that were determined to be booted.

Upon receiving the authentication parameter, e.g., secret key, and/or information indicating which server blade(s) coupled to the service unit are to be booted and/or information indicating which device is to boot those server blade(s), the service unit may update the configuration of those server blade(s). For example, the service unit may update a configuration file stored in the server blade indicating which network adapter, e.g., Ethernet Adapter, to boot to either the deployment server or the customer boot server. Furthermore, the service unit may update a configuration file to indicate which device, e.g., deployment server, customer boot server, to boot from. Furthermore, the service unit may write the authentication parameter, e.g., secret key, in the one or more server blades determined to be booted by either the deployment server or the customer boot server. By the service unit writing the authentication parameter, e.g., secret key, in the server blade instead of an administrator manually installing the authentication parameter, e.g., secret key, on server blade, the deployment server may be able to generate a unique authentication parameter, e.g., secret key, for each network boot operation. By deployment server generating a unique authentication parameter, e.g., secret key, for each network boot operation, the exposure to replay attacks may be substantially reduced.

The one or more server blades determined to boot from either the deployment server or the customer boot server may boot from the appropriate device, e.g., deployment server, customer boot server.

Once the server blade(s) initiate the boot from the appropriate device, e.g., deployment server, customer boot server, the appropriate device may transmit the digital signature and boot code image to the server blade(s). In one embodiment, the deployment server may be configured to coordinate one or more customer boot servers to store one or more different boot code images along with the digital signatures. Subsequently, a customer boot server may be configured to transmit the boot code image and the digital signature to the server blade that booted from that customer boot server. It is noted that the deployment server may also be configured to store one or more different boot code images and digital signatures as well as transmit the boot code image and digital signature to the server blade if the server blade booted from the deployment server.

A determination may then be made by the server blade receiving the boot code image and digital signature as to whether the digital signature is authenticated. If the server blade receiving the digital signature is able to authenticate the digital signature, then the server blade may boot the received boot code image. The server blade may authenticate the received digital signature by performing the same hash algorithm on the boot code image as the deployment server and then encrypting the generated message digest and boot code image using the same secret key. If there is a match between the digital signature generated by the server blade performing the hash algorithm on the boot code image as the digital signature generated by the deployment server performing the hash algorithm on the boot code image, then the server blade may conclude that the boot code image is intact and tamper free. However, if the server blade concluded that the boot code image was not intact or tamper free, then the server blade may discard the received boot code image. That is, if the server blade was not able to authenticate the received digital signature, then the server blade may discard the received boot code image.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which:

FIG. 6 is a flowchart of a method for remotely booting devices using asymmetric cryptography in accordance with the present invention; and FIG. 7 is a flowchart of a method for remotely booting devices using symmetric cryptography in accordance with the present invention.

DETAILED DESCRIPTION

Figure 1:
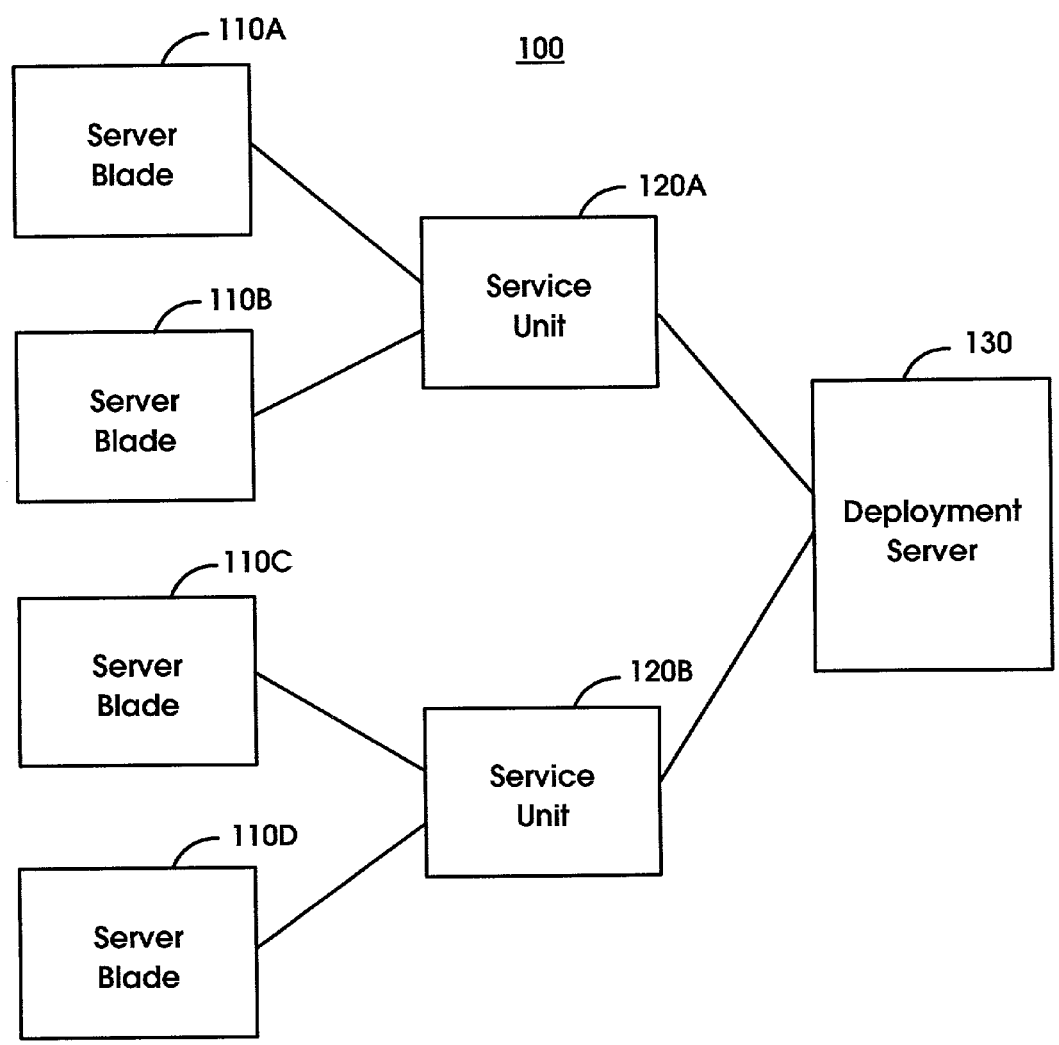
FIG. 1 illustrates a dense server environment configured in accordance with the present invention.

FIG. 1—Dense Server Environment with Private Interconnections

FIG. 1 illustrates an embodiment of the present invention of a dense server environment 100 with private interconnections between the elements of the dense server environment 100. Dense server environment 100 may comprise a plurality of server blades 110A–D coupled to one or more service units 120A–B which may be connected to one or more boot devices, e.g., deployment server 130. Server blades 110A–D may collectively or individually be referred to as server blades 110 or server blade 110, respectively. A detailed description of server blade 110 is provided in the description of FIG. 3. Service units 120A–B may collectively or individually be referred to as service units 120 or service unit 120, respectively. A detailed description of service unit 120 is provided in the description of FIG. 4. A detailed description of deployment server 130 is provided in the description of FIG. 5. It is noted that the private connection between server blade 110 and service unit 120 and the private connection between service unit 120 and deployment server 130 may be any medium type, e.g., wireless, wired. It is further noted that dense server environment 100 may comprise any number of server blades 110, service units 120 and deployment servers 130 and that FIG. 1 is illustrative. It is further noted that dense server environment 100 may be any type of system that has a plurality of server blades 110, at least one service unit 120 and at least one deployment server 130 and that FIG. 1 is not to be limited in scope to any one particular embodiment. For example, FIG. 2 illustrates an Internet Service Provider environment that implements a plurality of server blades 110, at least one service unit 120 and at least one deployment server 130 as discussed further below.

Referring to FIG. 1, server blade 110 may be a typical server that does not include a storage unit, e.g., hard disk drive, CD-ROM drive, floppy disk drive. Since server blade 110 may not include a storage unit configured to store a boot code image, i.e., binary executable boot code, server blade 110 may have to be remotely booted by deployment server 130. As stated in the Background Information section, typically, the boot device may implement network boot protocols, e.g., PXE/BIS, iSCSI, that require authentication parameters, e.g., public key, username/password, secret key, to be manually installed on the server blades by an administrator in order to remotely boot the server blades. Since the authentication parameters, e.g., public key, secret key, may have to be manually installed on the server blade by an administrator, the boot device may not generate unique authentication parameter(s), e.g., public/private key pair, secret key, for each network boot operation. That is, in order for the boot device to generate unique authentication parameter(s), e.g., public/private key pair, secret key, for each network boot operation, the administrator may have to physically visit the device to be booted for each network boot operation to update the authentication parameter(s), e.g., public key, secret key. Because of the time involved in updating the authentication parameters by the administrator, the authentication parameter(s), e.g., public/private key pair, secret key, may typically not be changed for each network boot operation. Consequently, the server blade may remotely boot from the boot device for multiple network boot operations using the same authentication parameter(s), e.g., public/private key pair, secret key. Accordingly, a security exposure to replay attacks may occur. If authentication parameter(s), e.g., public key, secret key, were configured remotely instead of manually installing them on the server blades, a boot device may be able to generate unique authentication parameter(s), e.g., public/private key pair, secret key, for each network boot operation thereby substantially reducing the exposure to replay attacks. Deployment server 130 may be configured to remotely configure authentication parameters, e.g., public key, of server blade 110 to be booted thereby being able to generate unique authentication parameter(s), e.g., public/private key pair, secret key, for each network boot operation which may substantially reduce exposure to replay attacks as explained in greater detail in conjunction with the description of FIGS. 6 and 7.

Figure 2:
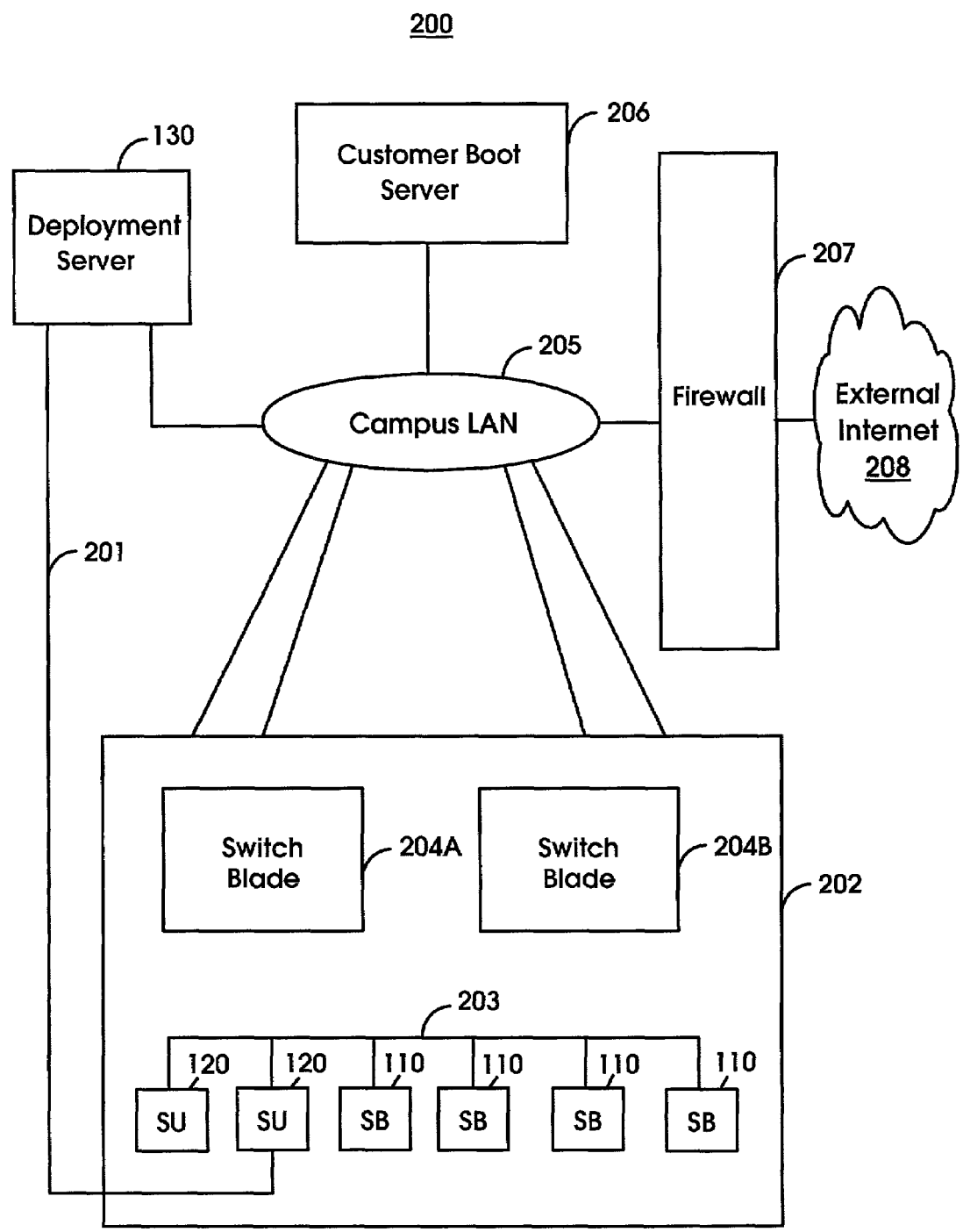
FIG. 2 illustrates an Internet service provider environment configured in accordance with the present invention.

FIG. 2—Internet Service Provider Environment

FIG. 2 illustrates an embodiment of the present invention of an Internet Service Provider (ISP) environment 200. ISP Environment 200 may comprise deployment server 130 (FIG. 1) coupled to a server blade chassis 202 via a private connection 201, e.g., private Local Area Network (LAN). Server blade chassis 202 may comprise a plurality of server blades 110 (FIG. 1) and one or more service units 120 (FIG. 1). As stated above, service units 120 may be configured to establish a connection between deployment server 130 and one or more server blades 110. Each service unit 120 may be coupled to one or more server blades 110 via a private connection 203. Each server blade 110 in server blade chassis 202 may be booted over a network such as a campus LAN 205 to deployment server 130 or a customer boot server 206. It is noted that server blade 110 may be booted over any type of network and that campus LAN 205 is illustrative. ISP Environment 200 may further comprise a firewall 207, e.g., single router, combination of routers and servers, to filter out unwanted packets of data from the external Internet 208 thereby keeping internal network segments secure. It is noted that the connection between server blade 110 and service unit 120 and the connection between service unit 120 and deployment server 130 may be any medium type, e.g., wireless, wired. It is further noted that ISP environment 200 may comprise any number of server blades 110, service units 120, deployment servers 130 and customer boot servers 206 and that FIG. 2 is illustrative. It is further noted that ISP environment 200 may be any type of system that has a plurality of server blades 110, at least one service unit 120 and at least one deployment server 130 where server blade 110 may boot to deployment server 130 or customer boot server 206 over a network, e.g., LAN, and that FIG. 2 is not to be limited in scope to any one particular embodiment.

Referring to FIG. 2, deployment server 130 may be configured to determine the network topology such as by identifying the one or more service units 120 coupled to the one or more server blades 110 determined to be booted by either deployment server 130 or customer boot server 206 as explained further below. Deployment server 130 may further be configured to generate a unique authentication parameter(s), e.g., public/private key pair, secret key associated with a network boot operation. Subsequent to generating a unique authentication parameter(s), in asymmetric cryptography, deployment server 130 may sign a boot code image, i.e., binary executable boot code, that will be booted by the one or more server blades 110 determined to be booted by either deployment server 130 or customer boot server 206. That is, deployment server 130 may encode the boot code image using the private key generated. Subsequent to generating a unique authentication parameter(s), in symmetric cryptography, deployment server 130 may implement a hash algorithm to generate a digital signature of the boot code image, i.e., binary executable boot code, that will be booted by the one or more server blades 110 determined to be booted by either deployment server 130 or customer boot server 206. It is noted that implementing a hash algorithm to generate a digital signature is well known in the art and that a detailed discussion of implementing a hash algorithm to generate a digital signature is avoided for sake of brevity.

Furthermore, deployment server 130 may be configured to transmit information indicating which server blade(s) 110 coupled to service unit 120 are to be booted. Deployment server 130 may further be configured to transmit to service unit 120 information indicating which device, e.g., deployment server 130, customer boot server 206, is to boot the one or more server blades 110 coupled to that service unit 120 determined to be booted. Deployment server 130 may further be configured to transmit the authentication parameter(s), e.g., public key, secret key, to one or more service units 120 coupled to the one or more server blades 110 determined to be booted by either deployment server 130 or customer boot server 206. In one embodiment, the authentication parameter(s), e.g., public key, secret key, the information indicating which server blade(s) 110 are to be booted and the information indicating which device, e.g., deployment server 130, customer boot server 206, is to boot those server blade(s) 110 may be transmitted by deployment server 130 over a private connection 201, e.g., private LAN, to service unit 120 coupled to those server blade(s) 110 to be booted.

Figure 3:
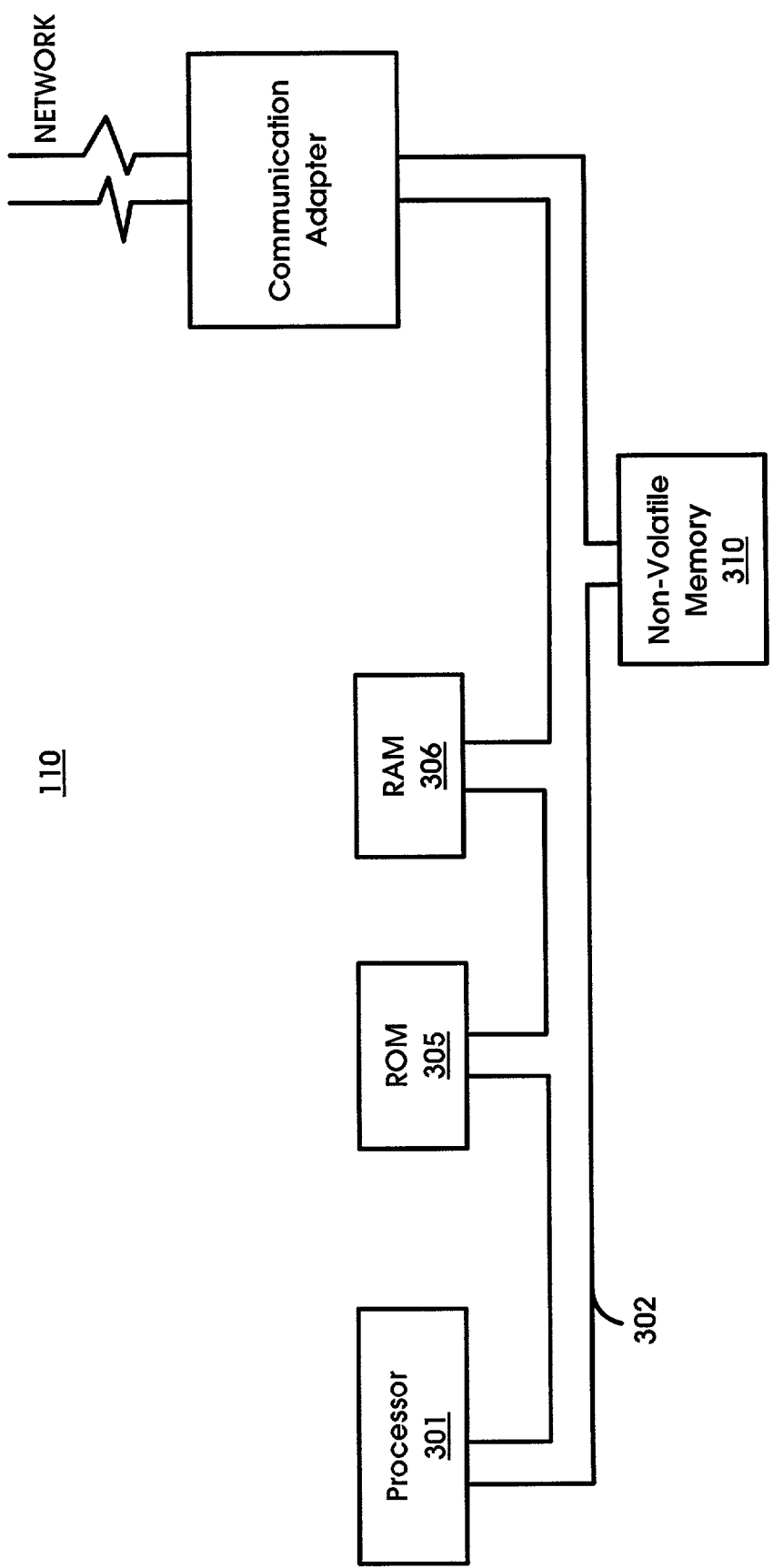
FIG. 3 illustrates an embodiment of the present invention of a server blade.

Upon receiving the authentication parameter(s), e.g., public key, secret key, and/or information indicating which server blade(s) 110 coupled to service unit 120 are to be booted and/or information indicating which device is to boot those server blade(s) 110, service unit 120 may be configured to update the configuration of those server blade(s) 110 over connection 203. For example, service unit 120 may update a configuration file stored in server blade 110 indicating which network adapter, e.g., Ethernet Adapter. Furthermore, service unit 120 may update a configuration file stored in server blade 110 to indicate which device, e.g., deployment server 130, customer boot server 206, to boot from. In one embodiment, the configuration file may be store in non-volatile memory as illustrated in FIG. 3. It is noted that there are other means for storing a configuration file in server blade 110 and that such means would be recognized by an artisan of ordinary skill in the art. It is further noted that embodiments employing such means would fall within the scope of the present invention. Furthermore, service unit 120 may write the authentication parameter(s), e.g., public key, secret key, in the one or more server blades 110 determined to be booted by either deployment server 130 or customer boot server 206. By service unit 120 writing the authentication parameter(s), e.g., public key, in server blade 110 instead of an administrator manually installing the authentication parameter(s), e.g., public key, secret key, on server blade 110, deployment server 130 may be able to generate unique authentication parameter(s), e.g., public/private key pair, secret key, for each network boot operation. By deployment server 130 generating unique authentication parameter(s), e.g., public/private key pair, secret key, for each network boot operation, exposure to replay attacks may be substantially reduced. In one embodiment, the authentication parameter(s), e.g., public key, secret key, may be written in non-volatile memory as illustrated in FIG. 3. It is noted that there are other means for storing an authentication parameter(s) in server blade 110 and that such means would be recognized by an artisan of ordinary skill in the art. It is further noted that embodiments employing such means would fall within the scope of the present invention.

The one or more server blades 110 determined to boot from either deployment server 130 or customer boot server 206 may be configured to boot from the appropriate device, e.g., deployment server 130, customer boot server 206, over the network, e.g., campus LAN 205. In one embodiment, server blade 110 may boot from the appropriate device as indicated in a configuration file stored in non-volatile memory as illustrated in FIG. 3.

In the embodiment using asymmetric cryptography, once server blade(s) 110 initiate to boot from the appropriate device, e.g., deployment server 130, customer boot server 206, the appropriate device may transmit the encrypted boot code image to the server blade(s) over the network, e.g., campus LAN 205. In the embodiment using symmetric cryptography, once server blade(s) 110 initiate to boot from the appropriate device, e.g., deployment server 130, customer boot server 206, the appropriate device may transmit the encrypted digital signature and encrypted boot code image to the server blade(s) over the network, e.g., campus LAN 205. In one embodiment, deployment server 130 may be configured to coordinate one or more different customer boot servers 206 to store one or more different boot code images in encrypted form. Subsequently, customer boot server 206 may be configured to transmit the encrypted boot code image to server blade 110 that booted from customer boot server 206. It is noted that deployment server 130 may also be configured to store one or more different boot code images in encrypted form as well as transmit the encrypted boot code image to server blade 110 if server blade 110 booted from deployment server 130.

Upon receiving either the encrypted boot code image and/or the encrypted digital signature, server blade 110 may determine whether or not to boot the received boot code image. In the embodiment using asymmetric cryptography, if the authentication parameter(s), e.g., public key, decrypt the received encrypted boot code image, then server blade 110 boots the received boot code image. If the authentication parameter(s), e.g., public key, do not decrypt the received encrypted boot code image, then server blade 110 discards the received boot code image. In the embodiment using symmetric cryptography, if server blade 110 is able to authenticate the received encrypted boot code image, then server blade 110 may boot the received boot code image. Server blade 110 may authenticate the received encrypted boot code image by decrypting the boot code image and then performing the same hash algorithm on the decrypted boot code image as deployment server 130. If there is a match between the digital signature generated by server blade 110 performing the hash algorithm on the boot code image as the digital signature generated by deployment server 130 performing the hash algorithm on the boot code image, then server blade 110 may conclude that the boot code image is intact and tamper free. However, if server blade 110 concluded that the boot code image was not intact or tamper free, then server blade 110 may discard the received boot code image. That is, if server blade 110 was not able to authenticate the received boot code image, then server blade 110 may discard the received boot code image.

It is noted that the above described process may be repeated for another network boot operation where boot device 130 may be configured to generate another unique authentication parameter(s), e.g., public/private key pair, secret key, associated with the next network boot operation. By deployment server 130 generating unique authentication parameter(s), e.g., public/private key, secret key, for each network boot operation, exposure to replay attacks may be substantially reduced FIG. 3—Hardware Configuration of Server Blade FIG. 3 illustrates an embodiment of the present invention of server blade 110. Server blade 110 may comprise a processor 301 coupled to various other components by a system bus 302. Read only memory (ROM) 305 may be coupled to system bus 302 and include a basic input/output system ("BIOS") that controls certain basic functions of server blade 110. ROM 305 may further store a program for booting to the appropriate device, e.g., deployment server 130 (FIGS. 1 and 2), customer boot server 206 (FIG. 2), as described in the description of FIG. 6. Random access memory (RAM) 306 and communications adapter 307 may also be coupled to system bus 302. RAM 306 may function as the server blade's 110 main memory. Communications adapter 307 may interconnect bus 302 with a network, e.g., campus LAN 205, enabling server blade 110 to communicate with a booting device, e.g., deployment server 130, customer boot server 206, thereby being able to boot a boot code image received from the booting device. Non-volatile memory 310, e.g., flash memory, Erasable Programmable Read Only Memory (EPROM), coupled to bus 302 may store a configuration file comprising information such as the following: authentication parameter(s), e.g., public key, secret key, list of network adapters, list of devices to boot from, e.g., deployment server 130, customer boot server 206. It is noted that the authentication parameter(s), e.g., public key, secret key, may be stored separately and independently from the configuration file. Non-volatile memory 310 may further store a program for booting to the appropriate device, e.g., deployment server 130 (FIGS. 1 and 2), customer boot server 206 (FIG. 2), as described in the description of FIGS. 6 and 7.

Implementations of the invention include implementations as a computer system programmed to execute the method or methods described herein, and as a computer program product. According to the computer system implementations, sets of instructions for executing the method or methods are resident in the random access memory 306 of one or more computer systems configured generally as described above. Until required by server blade 110, the set of instructions may be stored as a computer program product in another computer memory. Furthermore, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 4:
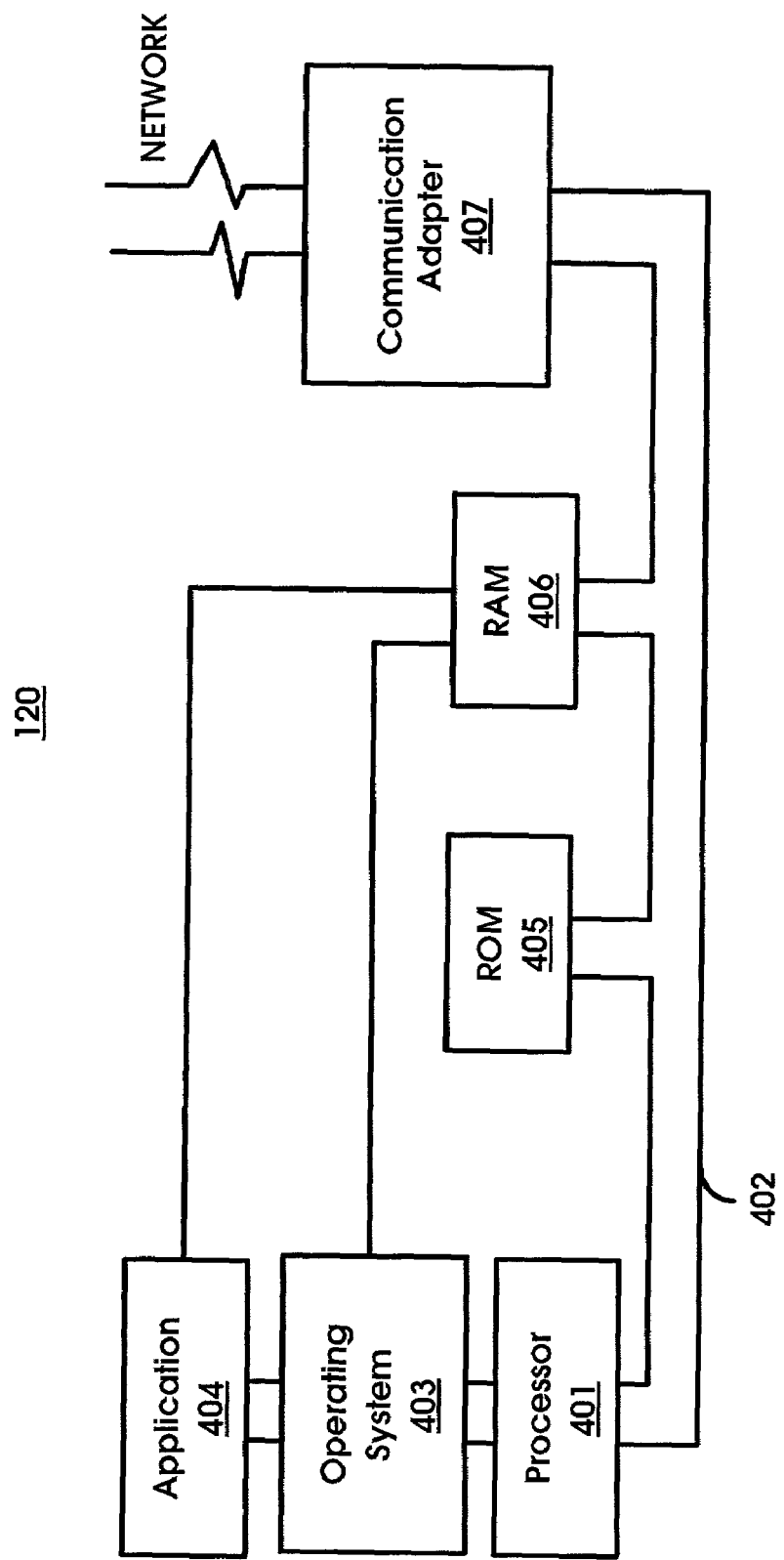
FIG. 4 illustrates an embodiment of the present invention of a service unit.

FIG. 4—Hardware Configuration of Service unit

FIG. 4 illustrates an embodiment of the present invention of service unit 120. Service unit 120 may comprise a processor 401 coupled to various other components by a system bus 402. An operating system 403 may run on processor 401 and provide control as well as coordinate the function of the various components of FIG. 4. Application 404 in accordance with the principles of the present invention may run in conjunction with operation system 403 and provide calls to operating system 403 where the calls implement the various functions or services to be performed by application 404. Application 404 may include for example, a program for updating the configuration of the one or more server blades 110 that were determined to be booted by the appropriate device, e.g., deployment server 130 (FIGS. 1 and 2), customer boot server 206 (FIG. 2), as described in the description of FIGS. 6 and 7. Read only memory (ROM) 405 may be coupled to system bus 402 and include a basic input/output system ("BIOS") that controls certain basic functions of service unit 120. Random access memory (RAM) 406 and communications adapter 407 may also be coupled to system bus 402. It should be noted that software components including operating system 403 and application 404 may be loaded into RAM 406 which is the service unit's 120 main memory. It is noted that the program that updates the configuration of the one or more server blades 110 that were determined to be booted by the appropriate device, e.g., deployment server 130, customer boot server 206, as described in the description of FIGS. 6 and 7 may reside in application 404. Communications adapter 407 may interconnect bus 402 with a network enabling service unit 120 to communicate with deployment server 130 or server blade 110 via private connection 201 or private connection 203, respectively.

Implementations of the invention include implementations as a computer system programmed to execute the method or methods described herein, and as a computer program product. According to the computer system implementations, sets of instructions for executing the method or methods are resident in the random access memory 406 of one or more computer systems configured generally as described above. Until required by service unit 120, the set of instructions may be stored as a computer program product in another computer memory. Furthermore, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 5:
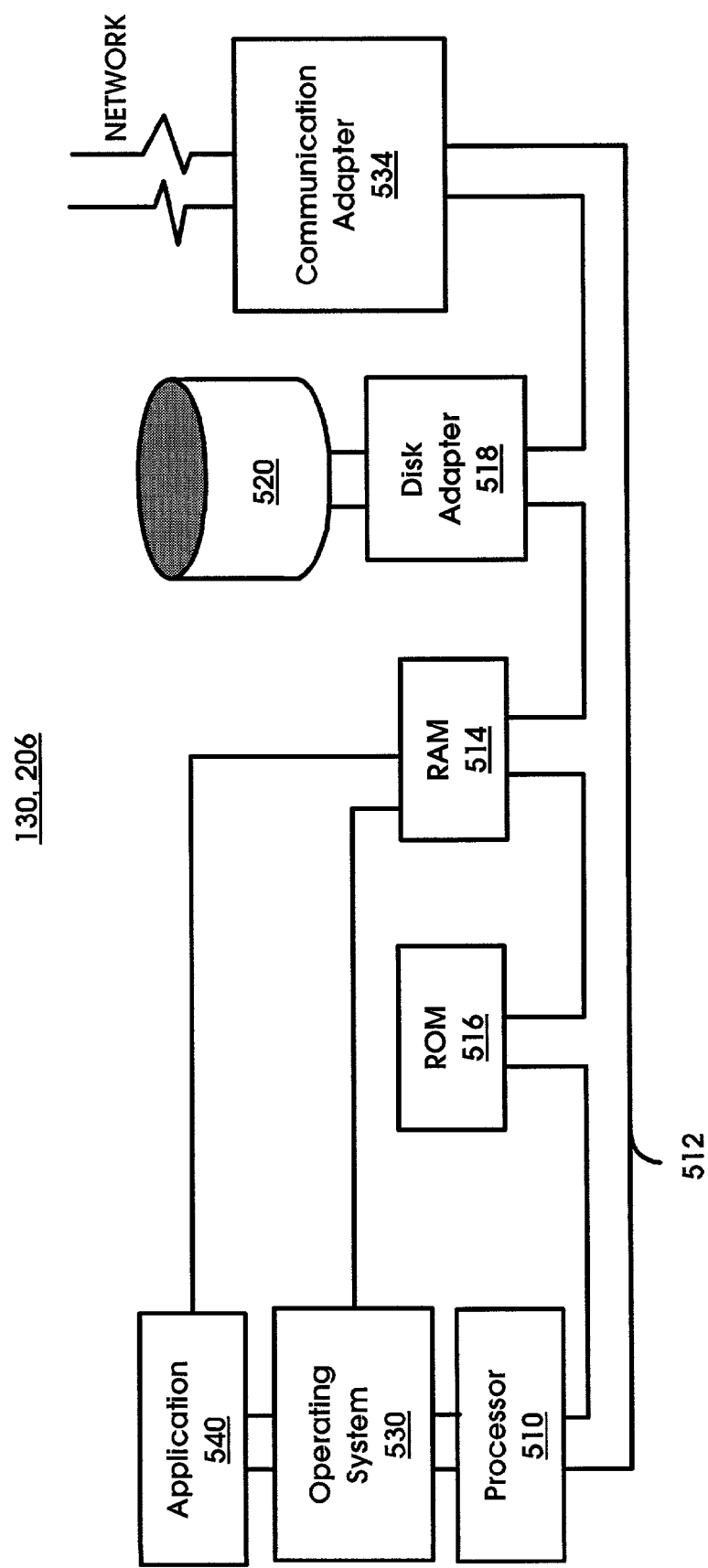
FIG. 5 illustrates an embodiment of the present invention of a deployment server and a customer boot server.

FIG. 5—Hardware Configuration of Deployment Server and Customer Boot Server

FIG. 5 illustrates an embodiment of the present invention of deployment server 130, customer boot server 206. Referring to FIG. 5, deployment server 130, customer boot server 206 may comprise a processor 510 coupled to various other components by system bus 512. An operating system 530 may run on processor 510 and provide control as well as coordinate the function of the various components of FIG. 5. Application 540 in accordance with the principles of the present invention may run in conjunction with operation system 530 and provide calls to operating system 530 where the calls implement the various functions or services to be performed by application 540. Application 540 of deployment server 130 may include for example, a program for remotely booting server blade 110 using asymmetric cryptography as described in the description of FIG. 6. Application 540 of deployment server 130 may include for example, a program for remotely booting server blade 110 using symmetric cryptography as described in the description of FIG. 7. Application 540 of customer boot server 206 may include for example, a program for transmitting a boot code image to server blade 110 as described in the description of FIGS. 6 and 7. Read only memory (ROM) 516 may be coupled to system bus 512 and include a basic input/output system ("BIOS") that may control certain basic functions of deployment server 130, customer boot server 206. Random access memory (RAM) 514, disk adapter 518 and communications adapter 534 may also be coupled to system bus 512. It should be noted that software components including operating system 530 and application 540 may be loaded into RAM 514 which may be the deployment server's 130, customer boot server's 206 main memory. Disk adapter 518 may be a small computer system interface ("SCSI") adapter that communicates with disk units 520, e.g., disk drive. It is noted that the program of the present invention that remotely boots server blade 110 using disk unit 520 or in application 540 of deployment server 130. It is further noted that the program of the present invention that remotely boots server blade 110 using symmetric cryptography as described in the description of FIG. 7 may reside in disk unit 520 or in application 540 of deployment server 130. It is further noted that the program of the present invention that transmits a boot code image to server blade 110 as described in the description of FIGS. 6 and 7 may reside in disk unit 520 or in application 540 of customer boot server 206. It is further noted that in one embodiment, deployment server 130 may comprise multiple communications adapters 534. Deployment server 130 may comprise one communications adapter 534 for interconnecting bus 512 with service unit 120 over a private connection, e.g., private connection 201. Deployment server 130 may comprise another communications adapter 534 for interconnecting bus 512 with server blade 110 over a public connection, e.g., campus LAN 205. Communications adapter 534 of customer boot server 206 may interconnect bus 512 with a network enabling customer boot server 206 to communicate with server blade 110 over campus LAN 205.

Implementations of the invention include implementations as a computer system programmed to execute the method or methods described herein, and as a computer program product. According to the computer system implementations, sets of instructions for executing the method or methods are resident in the random access memory 514 of one or more computer systems configured generally as described above. Until required by customer boot server 206, the set of instructions may be stored as a computer program product in another computer memory, for example, in disk drive 520 (which may include a removable memory such as an optical disk or floppy disk for eventual use in disk drive 520). Furthermore, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

FIG. 6—Method for Remotely Booting Devices Using Asymmetric Cryptography

FIG. 6 is a flowchart of one embodiment of the present invention of a method 600 for remotely booting devices using asymmetric cryptography without manually installing authentication parameters, e.g., public key, thereby enabling a boot device to generate unique authentication parameter(s), e.g., public/private key pair, for each network boot operation which may substantially reduce the exposure to replay attacks. As stated in the Background Information section, a boot device may implement network boot protocols, e.g., PXE/BIS, iSCSI, that require authentication parameters, e.g., public key, secret key, username/password, to be manually installed on the server blades by an administrator in order to remotely boot the server blades. Since the authentication parameters, e.g., public key, secret key, may have to be manually installed on the server blade by an administrator, the boot device may not generate unique parameter(s), e.g., public/private key pair, secret key, for each network boot operation. Consequently, the server blade may remotely boot from the boot device for multiple network boot operations using the same authentication, e.g., public/private key pair. Accordingly, a security exposure to replay attacks may occur. If authentication parameters, e.g., public key, were configured remotely instead of manually installing them on the server blades, a boot device may be able to generate unique authentication parameter(s), e.g., public/private key pair, secret key, for each network boot operation thereby substantially reducing the exposure to replay attacks. Method 600 is a method for remotely booting devices without manually installing authentication parameters, e.g., public key, thereby enabling a boot device to generate unique authentication parameter(s), e.g., public/private key pair, for each network boot operation which may substantially reduce the exposure to replay attacks.

In step 601, deployment server 130 (FIGS. 1 and 2) may determine the network topology such as by identifying the one or more service units 120 (FIGS. 1 and 2) coupled to the one or more server blades 110 (FIGS. 1 and 2) determined to be booted by either deployment server 130 or customer boot server 206.

In step 602, deployment server 130 may generate a unique authentication parameter(s), e.g., public/private key pair, associated with a network boot operation. In step 603, deployment server 130 may sign a boot code image, i.e., binary executable boot code, that will be booted by the one or more server blades 110 determined to be booted by either deployment server 130 or customer boot server 206. That is, deployment server 130 may encode the boot code image using the private key generated.

In step 604, deployment server 130 may transmit to service unit 120 the authentication parameter(s), e.g., public key generated, if any server blades 110 coupled to that service unit 120 are to be booted by either deployment server 130 or customer boot server 206. Deployment server 130 may further transmit the identification of the one or more server blades 110 coupled to that service unit 120 that are to be booted by either deployment server 130 or customer boot server 206. Deployment server 130 may further transmit to service unit 120 information as to which server, e.g., customer boot server 206, is to boot the one or more server blades 110 coupled to that service unit 120 that were determined to be booted. In one embodiment, the authentication parameter(s), e.g., public key, and above information may be transmitted over a connection such as private connection 201, e.g., private Local Area Network (LAN).

Upon receiving the authentication parameter(s), e.g., public key, and/or information indicating which server blade(s) 110 coupled to service unit 120 are to be booted and/or information indicating which device is to boot those server blade(s) 110, service unit 120 may update the configuration of those server blade(s) 110 in step 605. For example, service unit 120 may update a configuration file stored in server blade 110 indicating which network adapter, e.g., Ethernet Adapter, to boot to either deployment server 130 or customer boot server 206. Furthermore, service unit 120 may update a configuration file to indicate which device, e.g., deployment server 130, customer boot server 206, to boot from. In one embodiment, the configuration file may be stored in non-volatile memory 310 (FIG. 3). It is noted that there are other means for storing a configuration file in server blade 110 and that such means would be recognized by an artisan of ordinary skill in the art. It is further noted that embodiments employing such means would fall within the scope of the present invention. Furthermore, service unit 120 may write the authentication parameter(s), e.g., public key, in the one or more server blades 110 determined to be booted by either deployment server 130 or customer boot server 206. By service unit 120 writing the authentication parameter(s), e.g., public key, in server blade 110 instead of an administrator manually installing the authentication parameter(s), e.g., public key, on server blade 110, deployment server 130 may be able to generate unique authentication parameter(s), e.g., public/private key pair, for each network boot operation. By deployment server 130 generating unique authentication parameter(s), e.g., public/private key pair, for each network boot operation, the exposure to replay attacks may be substantially reduced. In one embodiment, the authentication parameter(s), e.g., public key, may be written in non-volatile memory 310. It is noted that there are other means for storing authentication parameter(s) in server blade 110 and that such means would be recognized by an artisan of ordinary skill in the art. It is further noted that embodiments employing such means would fall within the scope of the present invention.

In step 606, the one or more server blades 110 determined to boot from either deployment server 130 or customer boot server 206 may boot from the appropriate device, e.g., deployment server 130, customer boot server 206. In one embodiment, the one or more server blades 110 determined to boot from either deployment server 130 or customer boot server 206 may boot from the appropriate device over a public network, e.g., campus LAN 205 (FIG. 2).

Once the server blade(s) 110 initiate the boot from the appropriate device, e.g., deployment server 130, customer boot server 206, the appropriate device may transmit the encrypted boot code image to server blade(s) 110 in step 607. In one embodiment, the appropriate device, e.g., deployment server 130, customer boot server 206, may transmit the encrypted boot code image to server blade 110 over a network, e.g., campus LAN 205. In one embodiment, the deployment server may be configured to coordinate one or more customer boot servers to store one or more different boot code images in encrypted form. Subsequently, a customer boot server may be configured to transmit the encrypted boot code image to the server blade that booted from that customer boot server. It is noted that the deployment server may also be configured to store one or more different boot code images in encrypted form as well as transmit the encrypted boot code image to the server blade if the server blade booted from the deployment server.

In step 608, a determination may be made by server blade 110 receiving the encrypted boot code image as to whether the received boot code image is authenticated. If the received boot code image is authenticated, then server blade 110 may boot the received boot code image in step 609. That is, if the authentication parameter(s), e.g., public key, received by server blade 110 in step 605 decrypt the received encrypted boot code image, then server blade 110 may boot the received boot code image in step 609. If the authentication parameter(s), e.g., public key, received by server blade 110 in step 605 do not decrypt the received encrypted boot code image, then server blade 110 may discard the received boot code image in step 610. That is, if the received boot code image is not authenticated, then server blade 110 may discard the received boot code image in step 610.

It is noted that the above described steps 601–610 of method 600 may be repeated for another network boot operation where deployment server 130 may generate another unique authentication parameter(s), e.g., public/private key pair, associated with the next network boot operation. By deployment server 130 generating unique authentication parameter(s), e.g., public/private key pair, for each network boot operation, the exposure to replay attacks may be substantially reduced It is noted that method 600 may be executed in a different order presented and that the order presented in the discussion of FIG. 6 is illustrative. It is further noted that certain steps in method 600 may be executed almost concurrently. It is noted that steps 601–604 and 607 may be implemented by a program in deployment server 130 residing in application 540 (FIG. 5) or disk unit 520 (FIG. 5). It is further noted that step 607 may be implemented by a program in customer boot server 206 residing in application 540 or disk unit 520. It is further noted that step 605 may be implemented by a program in service unit 120 residing in application 404 (FIG. 4). It is further noted that steps 606, 608–610 may be implemented by a program in server blade 110 residing in ROM 305 (FIG. 3) or non-volatile memory 310.

FIG. 7—Method for Remotely Booting Devices Using Symmetric Cryptography

FIG. 7 is a flowchart of one embodiment of the present invention of a method 700 for remotely booting devices using symmetric cryptography without manually installing authentication parameters, e.g., secret key, thereby enabling a boot device to generate a unique authentication parameter, e.g., secret key, for each network boot operation which may substantially reduce the exposure to replay attacks.

In step 701, deployment server 130 (FIGS. 1 and 2) may determine the network topology such as by identifying the one or more service units 120 (FIGS. 1 and 2) coupled to the one or more server blades 110 (FIGS. 1 and 2) determined to be booted by either deployment server 130 or customer boot server 206.

In step 702, deployment server 130 may generate a unique authentication parameter, e.g., secret key, associated with a network boot operation. In step 703, deployment server 130 may implement a hash algorithm to generate what is commonly referred to as a message digest of the boot code image, i.e., binary executable boot code, that will be booted by the one or more server blades 110 determined to be booted by either deployment server 130 or customer boot server 206. It is noted that implementing a hash algorithm to generate a message digest is well known in the art and that a detailed discussion of implementing a hash algorithm to generate a message digest is avoided for sake of brevity.

In step 704, the message digest of the boot code image and the boot code image may be encoded using the authentication parameter generated, e.g., secret key, to generate what is commonly referred to as a digital signature. It is noted that generating a digital signature is well known in the art and that a detailed discussion of generating a digital signature is avoided for sake of brevity.

In step 705, deployment server 130 may transmit to service unit 120 the authentication parameter, e.g., secret key generated, if any server blades 110 coupled to that service unit 120 are to be booted by either deployment server 130 or customer boot server 206. Deployment server 130 may further transmit the identification of the one or more server blades 110 coupled to that service unit 120 that are to be booted by either deployment server 130 or customer boot server 206. Deployment server 130 may further transmit to service unit 120 information as to which server, e.g., customer boot server 206, is to boot the one or more server blades 110 coupled to that service unit 120 that were determined to be booted. In one embodiment, the authentication parameter, e.g., secret key, and above information may be transmitted over a connection such as private connection 201, e.g., private Local Area Network (LAN).

Upon receiving the authentication parameter, e.g., secret key, and/or information indicating which server blade(s) 110 coupled to service unit 120 are to be booted and/or information indicating which device is to boot those server blade(s) 110, service unit 120 may update the configuration of those server blade(s) 110 in step 706. For example, service unit 120 may update a configuration file stored in server blade 110 indicating which network adapter, e.g., Ethernet Adapter, to boot to either deployment server 130 or customer boot server 206. Furthermore, service unit 120 may update a configuration file to indicate which device, e.g., deployment server 130, customer boot server 206, to boot from. In one embodiment, the configuration file may be stored in non-volatile memory 310 (FIG. 3). It is noted that there are other means for storing a configuration file in server blade 110 and that such means would be recognized by an artisan of ordinary skill in the art. It is further noted that embodiments employing such means would fall within the scope of the present invention. Furthermore, service unit 120 may write the authentication parameter, e.g., secret key, in the one or more server blades 110 determined to be booted by either deployment server 130 or customer boot server 206. By service unit 120 writing the authentication parameter, e.g., secret key, in server blade 110 instead of an administrator manually installing the authentication parameter, e.g., secret key, on server blade 110, deployment server 130 may be able to generate a unique authentication parameter, e.g., secret key, for each network boot operation. By deployment server 130 generating a unique authentication parameter, e.g., secret key, for each network boot operation, the exposure to replay attacks may be substantially reduced. In one embodiment, the authentication parameter, e.g., secret key, may be written in non-volatile memory 310. It is noted that there are other means for storing an authentication parameter in server blade 110 and that such means would be recognized by an artisan of ordinary skill in the art. It is further noted that embodiments employing such means would fall within the scope of the present invention.

In step 707, the one or more server blades 110 determined to boot from either deployment server 130 or customer boot server 206 may boot from the appropriate device, e.g., deployment server 130, customer boot server 206. In one embodiment, the one or more server blades 110 determined to boot from either deployment server 130 or customer boot server 206 may boot from the appropriate device over a public network, e.g., campus LAN 205 (FIG. 2).

Once the server blade(s) 110 initiate the boot from the appropriate device, e.g., deployment server 130, customer boot server 206, the appropriate device may transmit the digital signature and boot code image to server blade(s) 110 in step 708. In one embodiment, the appropriate device, e.g., deployment server 130, customer boot server 206, may transmit the digital signature and boot code image to server blade 110 over a network, e.g., campus LAN 205. In one embodiment, the deployment server may be configured to coordinate one or more customer boot servers to store one or more different boot code images along with the digital signatures. Subsequently, a customer boot server may be configured to transmit the boot code image and digital signature to the server blade that booted from that customer boot server. It is noted that the deployment server may also be configured to store one or more different boot code images and digital signatures as well as transmit the boot code image and digital signature to the server blade if the server blade booted from the deployment server.

In step 709, a determination may be made by server blade 110 receiving the encrypted boot code image and digital signature as to whether the digital signature is authenticated. If server blade 110 receiving the digital signature is able to authenticate the digital signature, then server blade 110 may boot the received boot code image in step 710. Server blade 110 may authenticate the received digital signature by performing the same hash algorithm on the received boot code image as deployment server 130 and then encrypting the generated message digest and boot code image using the same secret key. If there is a match between the digital signature generated by server blade 110 performing the hash algorithm on the boot code image as the digital signature generated by deployment server 130 performing the hash algorithm on the boot code image, then server blade 110 may conclude that the boot code image is intact and tamper free. However, if server blade 110 concluded that the boot code image was not intact or tamper free, then server blade 110 may discard the received boot code image in step 711. That is, if server blade 110 was not able to authenticate the received digital signature, then server blade 110 may discard the received boot code image in step 711.

It is noted that the above described steps 701–711 of method 700 may be repeated for another network boot operation where deployment server 130 may generate another unique secret key associated with the next network boot operation. By deployment server 130 generating a unique secret key for each network boot operation, the exposure to replay attacks may be substantially reduced It is noted that method 700 may be executed in a different order presented and that the order presented in the discussion of FIG. 7 is illustrative. It is further noted that certain steps in method 700 may be executed almost concurrently. It is noted that steps 701–705 and 708 may be implemented by a program in deployment server 130 residing in application 540 (FIG. 5) or disk unit 520 (FIG. 5). It is further noted that step 708 may be implemented by a program in customer boot server 206 residing in application 540 or disk unit 520. It is further noted that step 706 may be implemented by a program in service unit 120 residing in application 404 (FIG. 4). It is further noted that steps 707, 709–711 may be implemented by a program in server blade 110 residing in ROM 305 (FIG. 3) or non-volatile memory 310.

Although the system and method are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for remotely booting devices comprising the steps of:
   generating a unique public/private key pair associated with a network boot operation;
   encrypting a boot code image with said private key;
   transmitting said public key to a service unit configured to establish a connection between a target device and a boot device, wherein said target device is a device booted by said boot device;
   writing said public key to said target device;
   booting to said boot device by said target device; and
   transmitting said encrypted boot code image by said boot device to said target device.

2. The method as recited in claim 1 further comprising the step of:
   booting said boot code image by said target device.

3. The method as recited in claim 2, wherein said boot code image is booted by said target device if said boot code image is authenticated.

4. The method as recited in claim 1 further comprising the step of:
   discarding said boot code image by said target device.

5. The method as recited in claim 4, wherein said boot code image is discarded by said target device if said boot code image is not authenticated.

6. The method as recited in claim 1 further comprising the steps of:
   determining a network topology by identifying said target device and said service unit coupled to said target device; and
   transmitting an identification of said target device to said service unit.

7. A system, comprising:
   a boot device;
   a target device configured to be booted by said boot device; and
   a service unit coupling said boot device to said target device, wherein said service unit is configured to establish a connection between said target device and said boot device;
   wherein said boot device comprises:
      a memory unit operable for storing a program operable for remotely booting devices; and
      a processor coupled to said memory, wherein said processor, responsive to said program, comprises:
         circuitry operable for generating a unique public/private key pair associated with a network boot operation;
         circuitry operable for encrypting a boot code image with said private key;
         circuitry operable for transmitting said public key to said service unit, wherein said service unit is configured to write said public key to said target device; and
         circuitry operable for transmitting said encrypted boot code image to said target device.

8. The system as recited in claim 7, wherein said target device is configured to boot said boot code image if said boot code image is authenticated.

9. The system as recited in claim 7, wherein said target device is configured to discard said boot code image if said boot code image is not authenticated.

10. The system as recited in claim 7, wherein said boot device further comprises:
    circuitry operable for determining a network topology by identifying said target device and said service unit coupled to said target device; and
    circuitry operable for transmitting an identification of said target device to said service unit.

11. A system, comprising:
    means for generating a unique public/private key pair associated with a network boot operation;
    means for encrypting a boot code image with said private key;
    means for transmitting said public key to a service unit configured to establish a connection between a target device and a boot device, wherein said target device is a device booted by said boot device;

means for writing said public key to said target device;

means for booting to said boot device by said target device; and means for transmitting said encrypted boot code image by said boot device to said target device.

12. The system as recited in claim 11 further comprises:

means for booting said boot code image by said target device.

13. The system as recited in claim 12, wherein said boot code image is booted by said target device if said boot code image is authenticated.

14. The system as recited in claim 11 further comprises:

means for discarding said boot code image by said target device.

15. The system as recited in claim 14, wherein said boot code image is discarded by said target device if said boot code image is not authenticated.

16. The system as recited in claim 11 further comprises:

means for determining a network topology by identifying said target device and said service unit coupled to said target device; and means for transmitting an identification of said target device to said service unit.

17. A system, comprising:

a target device;

a boot device configured to coordinate booting of said target device;

a service unit coupling said boot device to said target device, wherein said service unit is configured to establish a connection between said target device and said boot device; and a server coupled to said boot device and to said target device, wherein said server is configured to remotely boot said target device;

wherein said boot device comprises:

a memory unit operable for storing a program operable for coordinating the remote booting of devices; and a processor coupled to said memory, wherein said processor, responsive to said program, comprises:

circuitry operable for generating a unique public/private key pair associated with a network boot operation;

circuitry operable for encrypting a boot code image with said private key; and circuitry operable for transmitting said public key to said service unit, wherein said service unit is configured to write said public key to said target device;

wherein said server comprises:

a memory unit operable for storing a program operable for remotely booting devices; and a processor coupled to said memory, wherein said processor, responsive to said program, comprises:

circuitry operable for transmitting said encrypted boot code image to said target device.

18. The system as recited in claim 17, wherein said target device is configured to boot said boot code image if said boot code image is authenticated.

19. The system as recited in claim 17, wherein said target device is configured to discard said boot code image if said boot code image is not authenticated.

20. The system as recited in claim 17, wherein said boot device further comprises:

circuitry operable for determining a network topology by identifying said target device and said service unit coupled to said target device;

circuitry operable for transmitting an identification of said target device to said service unit; and circuitry operable for transmitting an identification of said server to boot said target device to said service unit.

21. The system as recited in claim 20, wherein said service unit is configured to update a configuration of said target device indicating to boot from said server.

22. The system as recited in claim 21, wherein said service unit is configured to write said public key to said target device.

23. A computer program product embodied in a machine readable medium for remotely booting devices comprising the programming steps of:

generating a unique public/private key pair associated with a network boot operation;

encrypting a boot code image with said private key;

transmitting said public key to a service unit configured to establish a connection between a target device and a boot device, wherein said target device is a device booted by said boot device;

writing said public key to said target device;

booting to said boot device by said target device; and transmitting said encrypted boot code image by said boot device to said target device.

24. The computer program product as recited in claim 23 further comprising the programming step of:

booting said boot code image by said target device.

25. The computer program product as recited in claim 24, wherein said boot code image is booted by said target device if said boot code image is authenticated.

26. The computer program product as recited in claim 23 further comprising the programming step of:

discarding said boot code image by said target device.

27. The computer program product as recited in claim 26, wherein said boot code image is discarded by said target device if said boot code image is not authenticated.

28. The computer program product as recited in claim 23 further comprising the programming steps of:

determining a network topology by identifying said target device and said service unit coupled to said target device; and transmitting an identification of said target device to said service unit.

29. A method for remotely booting devices comprising the steps of:

generating a unique secret key associated with a network boot operation;

generating a message digest of a boot code image;

generating a digital signature by encrypting said message digest and said boot code image using said secret key;

transmitting said secret key to a service unit configured to establish a connection between a target device and a boot device, wherein said target device is a device booted by said boot device;

writing said secret key to said target device;

booting to said boot device by said target device; and transmitting said digital signature and said boot code image by said boot device to said target device.

30. The method as recited in claim 29 further comprising the step of:

booting said boot code image by said target device.

31. The method as recited in claim 30, wherein said boot code image is booted by said target device if said target device authenticated said digital signature.

32. The method as recited in claim 29 further comprising the step of:
  discarding said boot code image by said target device.

33. The method as recited in claim 32, wherein said boot code image is discarded by said target device if said target device did not authenticate said digital signature.

34. The method as recited in claim 29 further comprising the steps of:
  determining a network topology by identifying said target device and said service unit coupled to said target device; and
  transmitting an identification of said target device to said service unit.

35. A system, comprising:
  a boot device;
  a target device configured to be booted by said boot device; and
  a service unit coupling said boot device to said target device, wherein said service unit is configured to establish a connection between said target device and said boot device;
  wherein said boot device comprises:
    a memory unit operable for storing a program operable for remotely booting devices; and
    a processor coupled to said memory, wherein said processor, responsive to said program, comprises:
      circuitry operable for generating a unique secret key associated with a network boot operation;
      circuitry operable for generating a message digest of a boot code image;
      circuitry operable for generating a digital signature by encrypting said message digest and said boot code image using said secret key;
      circuitry operable for transmitting said secret key to said service unit, wherein said service unit is configured to write said secret key to said target device; and
      circuitry operable for transmitting said digital signature and said boot code image to said target device.

36. The system as recited in claim 35, wherein said target device is configured to boot said boot code image if said target device authenticated said digital signature.

37. The system as recited in claim 35, wherein said target device is configured to discard said boot code image if said target device did not authenticate said encrypted boot code image.

38. The system as recited in claim 35, wherein said boot device further comprises:
  circuitry operable for determining a network topology by identifying said target device and said service unit coupled to said target device; and
  circuitry operable for transmitting an identification of said target device to said service unit.

39. A system, comprising:
  means for generating a unique secret key associated with a network boot operation;
  means for generating a message digest of a boot code image;
  means for generating a digital signature by encrypting said message digest and said boot code image using said secret key;
  means for transmitting said secret key to a service unit configured to establish a connection between a target device and a boot device, wherein said target device is a device booted by said boot device;
  means for writing said secret key to said target device;
  means for booting to said boot device by said target device; and
  means for transmitting said digital signature and said boot code image by said boot device to said target device.

40. The system as recited in claim 39 further comprises:
  means for booting said boot code image by said target device.

41. The system as recited in claim 40, wherein said boot code image is booted by said target device if said target device authenticated said digital signature.

42. The system as recited in claim 36 further comprises:
  means for discarding said boot code image by said target device.

43. The system as recited in claim 42, wherein said boot code image is discarded by said target device if said target device did not authenticate said digital signature.

44. The system as recited in claim 39 further comprises:
  means for determining a network topology by identifying said target device and said service unit coupled to said target device; and
  means for transmitting an identification of said target device to said service unit.

45. A system, comprising:
  a target device;
  a boot device configured to coordinate booting of said target device;
  a service unit coupling said boot device to said target device, wherein said service unit is configured to establish a connection between said target device and said boot device; and
  a server coupled to said boot device and to said target device, wherein said server is configured to remotely boot said target device;
  wherein said boot device comprises:
    a memory unit operable for storing a program operable for coordinating the remote booting of devices; and
    a processor coupled to said memory, wherein said processor, responsive to said program, comprises:
      circuitry operable for generating a unique secret key associated with a network boot operation;
      circuitry operable for generating a message digest of a boot code image;
      circuitry operable for generating a digital signature by encrypting said message digest and said boot code image using said secret key;
      circuitry operable for transmitting said secret key to said service unit, wherein said service unit is configured to write said public key to said target device;
  wherein said server comprises:
    a memory unit operable for storing a program operable for remotely booting devices; and
    a processor coupled to said memory, wherein said processor, responsive to said program, comprises:
      circuitry operable for transmitting said digital signature and said boot code image to said target device.

46. The system as recited in claim 45, wherein said target device is configured to boot said boot code image if said target device authenticated said digital signature.

47. The system as recited in claim 45, wherein said target device is configured to discard said boot code image if said target device did not authenticate said digital signature.

48. The system as recited in claim 45, wherein said boot device further comprises:
- circuitry operable for determining a network topology by identifying said target device and said service unit coupled to said target device;
- circuitry operable for transmitting an identification of said target device to said service unit; and
- circuitry operable for transmitting an identification of said server to boot said target device to said service unit.

49. The system as recited in claim 48, wherein said service unit is configured to update a configuration of said target device indicating to boot from said server.

50. The system as recited in claim 49, wherein said service unit is configured to write said secret key to said target device.

51. A computer program product embodied in a machine readable medium for remotely booting devices comprising the programming steps of:
- generating a unique secret key associated with a network boot operation;
- generating a message digest of a boot code image;
- generating a digital signature by encrypting said message digest and said boot code image using said secret key;
- transmitting said secret key to a service unit configured to establish a connection between a target device and a boot device, wherein said target device is a device booted by said boot device;
- writing said secret key to said target device;
- booting to said boot device by said target device; and
- transmitting said digital signature and said boot code image by said boot device to said target device.

52. The computer program product as recited in claim 51 further comprising the programming step of:
- booting said boot code image by said target device.

53. The computer program product as recited in claim 52, wherein said boot code image is booted by said target device if said target device authenticated said digital signature.

54. The computer program product as recited in claim 51 further comprising the programming step of:
- discarding said boot code image by said target device.

55. The computer program product as recited in claim 54, wherein said boot code image is discarded by said target device if said target device did not authenticate said digital signature.

56. The computer program product as recited in claim 51 further comprising the programming steps of:
- determining a network topology by identifying said target device and said service unit coupled to said target device; and
- transmitting an identification of said target device to said service unit.

\* \* \* \* \*